INVENTOR.
Carl A. Stickel
BY Spencer Hardman and Fehr
ATTORNEYS

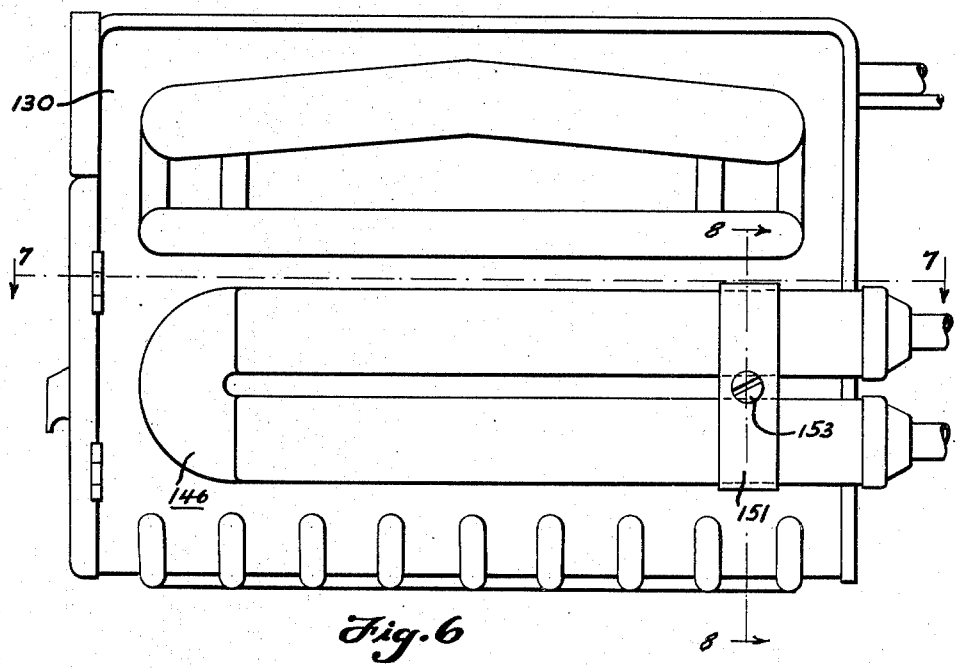
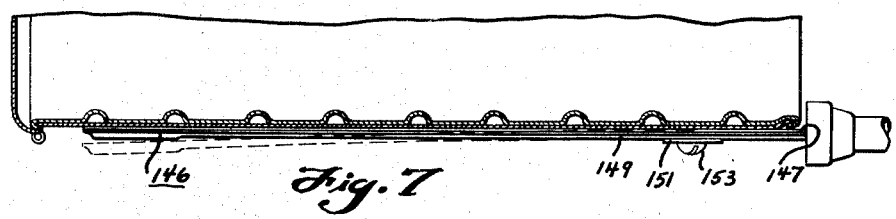
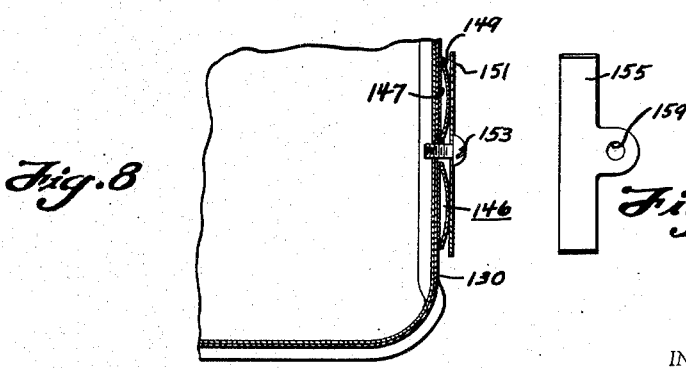

INVENTOR.
Carl A. Stickel
ATTORNEYS

Patented June 24, 1941

2,246,551

UNITED STATES PATENT OFFICE 2,246,551

REFRIGERATING APPARATUS

Carl A. Stickel, Dayton, Ohio, assignor to General Motors Corporation, Dayton, Ohio, a corporation of Delaware Application September 29, 1939, Serial No. 297,147

6 Claims. (Cl. 62—116)

This invention relates to refrigerating apparatus and more particularly to a refrigerating system which includes a primary and a secondary refrigerant circuit.

When systems employing a primary and a simple secondary system are used, the temperature of the secondary system normally follows the temperature of the primary system. It has been proposed to use valves in the secondary system to control the temperature of the secondary system but for systems to be used in household refrigeration and other systems produced in mass production, it is usually considered undesirable to introduce any moving parts, such as valves within the system. It has also been proposed to use a mixture of refrigerants or inert gas in the secondary refrigerant circuit but such expedients only serve to maintain a temperature differential between the primary and secondary circuits and do not prevent the fluctuation of temperature in the secondary circuit in response to change of fluctuations in temperature of the primary circuit.

It is therefore an object of my invention to provide means without moving parts in the secondary circuit which will keep the secondary circuit at a substantially constant temperature regardless of the fluctuations of the primary refrigerant circuit.

It is another object of my invention to provide means for varying the contact between the primary and secondary circuits in accordance with the fluctuations in temperature of the primary circuit in order to regulate and maintain substantially constant the temperature of the secondary refrigerant circuit.

It is still another object of my invention to control the heat transfer between the primary and secondary circuits in accordance with the temperature of the primary evaporator.

One of the common applications of a primary-secondary refrigerant circuit system is the two compartment refrigerator commonly known as a cold wall refrigerator which employs a secondary refrigerant circuit for cooling the food compartment. In such a refrigerator, a temperature regulator is ordinarily provided for varying the temperature of the primary evaporator. It is desirable to prevent fluctuations of the temperature of the food compartment cooled by the secondary refrigerant circuit through the cold wall in order to maintain a proper food preserving temperature at all times regardless of the fluctuations of temperature of the primary evaporator.

It is therefore an object of my invention to provide a two-compartment refrigerator having its food compartment cooled by a simple secondary refrigerant circuit in which the temperature of the primary evaporator may be varied without causing fluctuations of temperature in the food compartment.

Further objects and advantages of the present invention will be apparent from the following description, reference being had to the accompanying drawings, wherein a preferred form of the present invention is clearly shown.

In the drawings:

Fig. 6 is a view similar to Fig. 2 showing a modified form of the invention;

Fig. 7 is a sectional view taken along the lines 7—7 of Fig. 6;

Fig. 8 is a sectional view taken along the lines 8—8 of Fig. 6;

Fig. 9 shows a shim which may be used for adjusting the secondary condenser;

Briefly, I have shown a household refrigerator cabinet in which a glass plate divides the cabinet into upper and lower compartments. A primary evaporator is provided in the upper compartment, and a lower compartment, used for food storage, is cooled by a secondary refrigerant circuit which extends around the side, rear and bottom walls of the lower compartment. This secondary circuit has a condenser portion extending into the upper compartment which is removably clamped at at least one point to the smooth side wall of the primary evaporator. The primary refrigerating system is provided with a temperature regulator which controls the operation of the primary refrigerating system so that different temperatures may be maintained in the primary evaporator according to the position of the temperature regulator. In order to prevent the changes in setting of the temperature regulator from affecting the temperature maintained in the lower compartment bimetal means are provided for varying the contact between the condenser of the secondary circuit and the smooth side wall of the primary evaporator so as to compensate for the temperature changes of the primary evaporator for the purpose of keeping the lower compartment at a proper food preserving temperature at all times.

In the first form a bimetal effect is caused by soldering or brazing a bronze bar onto the outside of the copper tube used as a condenser for the secondary circuit in order to cause the condenser to curl away from the smooth wall of the primary evaporator more and more as the primary evaporator is reduced below normal temperatures. In the second form the condenser is made of two flat sheets of material, such as copper and bronze to form a relatively flat plate which is sealed at its edges. The two materials of the plate form a bimetal which will curl away from the smooth side wall of the primary evaporator more and more as the temperature of the primary evaporator is reduced below normal. In the third form transverse bimetal strips are used to hold the secondary condenser in contact with the smooth side wall of the primary evaporator at normal temperatures. As the temperatures of the primary evaporator are reduced more and more below normal, the bimetal strips tend to move the secondary condenser more and more away from the smooth side wall of the primary evaporator so as to reduce the heat transfer between the primary evaporator and the secondary condenser.

Figure 1:
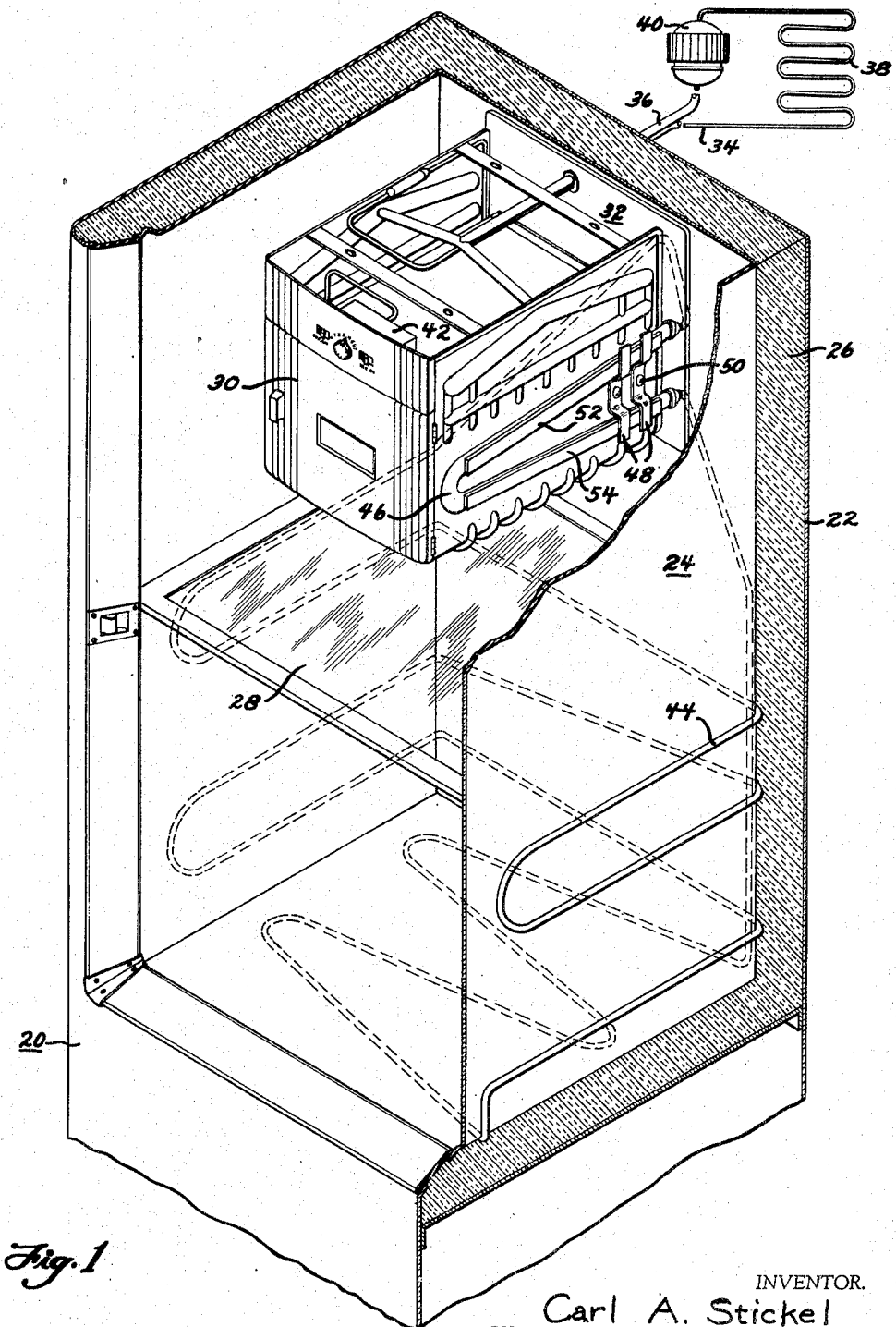
Fig. 1 is an isometric view, partly in section, of a household refrigerator cabinet of the two-compartment "cold wall" type embodying one form of my invention.

Referring now more particularly to the drawings there is shown in Fig. 1 a household refrigerator cabinet, generally designated by the reference character 20, containing outer metal walls 22 and an inner liner 24 which is separated from the outer walls 22 by the insulating means 26. The inner liner 24 is formed of sheet metal in a box shape and its interior is divided into an upper and lower compartment by a glass plate 28 which may be provided with a rubber seal around its edges so as to normally seal the two compartments from each other. If desired, however, the rubber binding may be provided with apertures or may be omitted at one or more edges so as to allow a limited amount of intercommunication between the two compartments. The lower compartment is intended to be used for foodstuffs requiring a relatively high humidity at normal refrigerated temperatures. The upper compartment is intended to be used for foodstuffs not requiring a high humidity or requiring a low humidity.

A primary evaporator 30 is mounted in the upper compartment in such a way that it may be removed for repairs and service. Preferably the primary evaporator 30 is removably connected to the top wall of the inner liner 24. This primary evaporator contains shelves for supporting freezing trays. The rear wall of the cabinet 20 is provided with a removable section 32 through which the primary evaporator 30 may be removed. This removable section 32 includes a removable plate in the outer wall 22 and a removable insulating piece directly behind the removable plate for the inner liner. The primary evaporator 30 is connected by a flexible supply conduit 34 and a flexible suction conduit 36 to the condenser 38 and the compressor 40. The operation of the compressor 40 is controlled by a temperature regulator 42 mounted upon the evaporator trim as shown in Fig. 1, and provided with a temperature regulating adjustment for the purpose of controlling the operation of the compressor 40 in order to maintain the primary evaporator 30 at different desired temperatures. Such a control may provide an extreme range of temperatures of more than 30° F.

This primary evaporator 30 is depended upon for freezing ice and making frozen desserts as well as for properly cooling the upper and lower storage compartments. It provides direct cooling for the upper compartment but because of the glass plate 28, a secondary refrigerant circuit designated by the reference character 44 is provided for cooling the lower compartment. This secondary refrigerant circuit 44 includes a condenser portion 46 which is clamped onto the smooth side wall of the primary evaporator by a pair of spring clamps 48 which are formed of a plurality of leaves of spring material such as spring bronze. These clamps are fastened to the smooth side wall of the primary evaporator by screws 50 which can be readily removed in order to allow the primary refrigerating system to be removed from the cabinet for service and repair while the secondary circuit remains in place in the cabinet.

Figure 2:
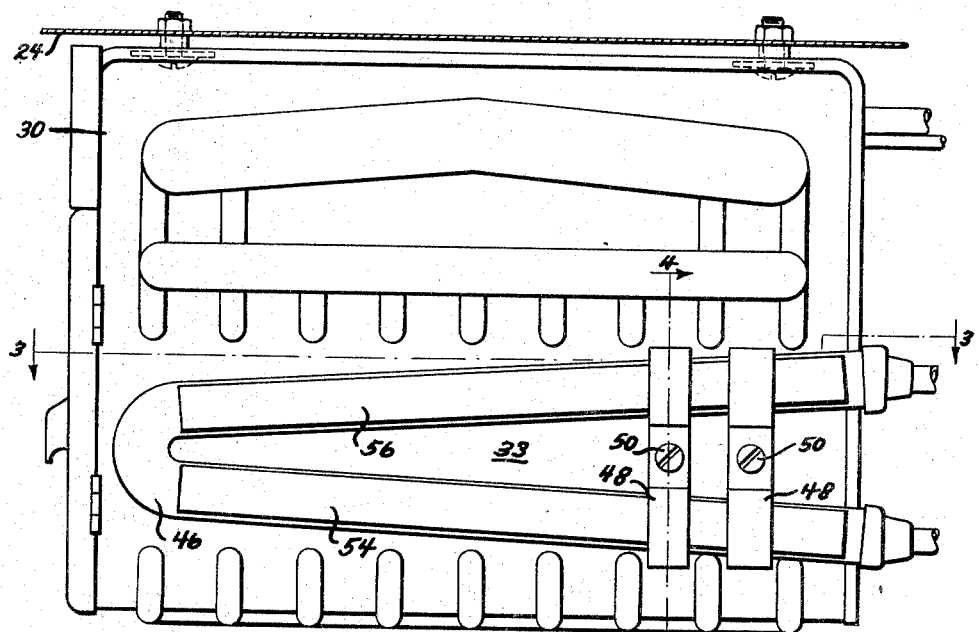
Fig. 2 is a view in elevation of the primary evaporator and secondary condenser shown in Fig. 1.
Figure 3:
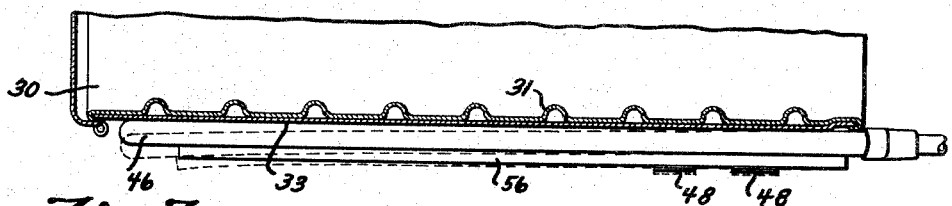
Fig. 3 is a sectional view taken along the lines 3—3 of Fig. 2.
Figures 4, 5:
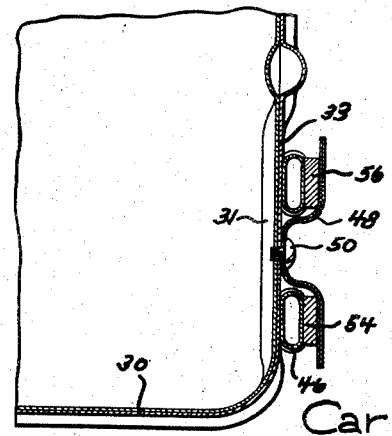
Fig. 4 is a sectional view taken along the lines 4—4 of Fig. 2.
Fig. 5 is a view in elevation of a shim used for adjusting purposes.

It will be seen from Figs. 2 to 4 that the primary evaporator 30 is provided with refrigerant passages 31 on the inside of the smooth wall portion 33 so that a smooth wall can readily be provided for contact with the secondary condenser 46. The remaining portion of the refrigerant passages are formed on the outside of the primary evaporator as is customary. The clamps as well as the bimetal strips are made sufficiently springy to prevent the stressing of the bimetal beyond its elastic limit so as to prevent any permanent set of the bimetal material under extreme temperature conditions or other high stress conditions. The evaporating portion of the secondary refrigerant circuit is wound upon the outside of the lower portion of the inner liner so that it is in contact with the bottom, side and rear walls of the lower compartment. By maintaining the secondary refrigerant circuit at a temperature of about 35° F. a very satisfactory form of refrigeration is provided for the lower compartment in order to keep fruit and vegetables and other foodstuffs requiring a high humidity for best preservation.

It has been found that when the temperature regulator of the primary evaporator is turned to positions causing the primary evaporator to be maintained at a lower temperature for fast freezing purposes, there is a tendency for the lower food compartment to become too cold and sometimes become sufficiently cold to freeze food stored therein. In order to avoid the use of any moving parts within the secondary refrigerant circuit I have provided means for varying the contact between the secondary condenser 46 and the primary evaporator 30 so as to prevent the lower food compartment from becoming too cold and freezing food therein.

In order to do this I make my secondary condenser 46, and preferably the remainder of the secondary circuit, out of copper tubing which has a thermal coefficient of expansion of about $.141 \times 10^{-4}$. The secondary condenser 46 is in the form of a single hairpin-shaped loop which has its closed end adjacent the front of the primary evaporator and has its rear ends connected to the evaporator portion of the secondary circuit 44 which is wound about the lower portion of the inner liner 24. The connection between the condenser portion 46 and the evaporator portion of the secondary circuit 44 is made through slots in the edge of the removable rear wall portion 32 of the cabinet 20. The rear portion of the condenser 46, as said before, is held against the smooth side wall of the primary evaporator 30 by the spring clamps 48.

Fastened to the outer face of the upper and lower portions of the condenser loop are bronze bars 52 and 54. These bronze bars are preferably fastened to the outer face of the copper tubing by silver solder or some other form of high strength solder or by some form of welding. The bronze bars preferably have a composition of 93½% copper and 6½% tin. This bronze has a high coefficient expansion as compared with copper. The coefficient of this material is about $.365 \times 10^{-4}$. The condenser loop and the bronze bars are so formed that at normal temperatures of the primary evaporator 30 they will lie flat upon the smooth side wall surface of the primary evaporator. However, as the temperature of the primary evaporator is reduced below normal the bronze bars 52 and 54 will contract more rapidly than the copper tubing of the secondary condenser 46 and, as illustrated in dotted lines in Fig. 3, will cause the front end of the secondary condenser 46 to curl away from the smooth side wall of the primary evaporator more and more as the temperature of the primary evaporator 30 is reduced. This will reduce the heat transfer between the smooth metal side walls of the primary evaporator and the wall of the copper tubing forming the condenser portion 46. This condenser portion 46 may be provided with flat tubing, if desired. The bronze bars may be made of such length, width and thickness to provide the proper amount of curling or bending of the condenser in order to provide the correct variation in contact between the secondary condenser 46 and the walls of the primary evaporator in order to provide the proper amount of heat transfer between the primary evaporator and the secondary condenser to maintain the lower compartment at the proper temperature at all times regardless of the variations in temperature of the primary evaporator 30. Adjustment, when necessary, may be made by inserting shims 49 between the evaporator wall and the secondary condenser adjacent one of the clamps 48 to turn the condenser 46 toward or away from the evaporator wall. The shims 49 preferably are in the form of straight narrow strips of thin metal provided with an aperture 51 which receives the screw 50. It should be noted that this variation in contact between the primary evaporator and the secondary condenser will not only take care of variations in temperature of the primary evaporator caused by changes in setting of the temperature regulator but will also compensate for changes in temperatures caused by the normal cycling of the primary refrigerating system which causes fluctuations in temperature of the primary evaporator. If desired a strip of material having extremely low or negative thermal expansion, such as "invar" steel may be welded to the inner face of the condenser loop either in connection with or without the bronze bar to serve the same function.

In the form shown in Figs. 6, 7 and 8 the primary evaporator, designated by the reference character 130, is provided with a secondary condenser 146 in the form of a plate. This plate is made by taking a copper sheet 147 and a bronze sheet 149 and welding the sheets together around their edges as well as at such intermediate points as desired for strengthening purposes. Other combinations of metals, such as invar and bronze or stainless steel and bronze, may be used. As shown in Figs. 6, 7 and 8 this plate is made in the form of a U and is clamped at its rear end to the rear portion of the smooth side wall of the primary evaporator 130 by a clamping bar 151 which is held against the outer wall of the condenser portion 146 by a clamping screw 153 which fastens the clamping bar to the side wall of the evaporator. The condenser portion 146 is made thicker at one end in order to prevent transverse curl of the bimetal condenser plate. The remaining portion of the secondary condenser plate may be made relatively thin in order to provide adequate bimetal action. This bimetal action may be regulated by making the two sheets of material of different thickness in order to obtain the results desired. Fig. 7 shows the secondary condenser 146 in full lines against the smooth side wall of the primary evaporator in the position which it assumes when the primary evaporator is at normal temperatures. In dotted lines, Fig. 7 shows the position of the secondary condenser curled away from the side wall of the primary evaporator so as to illustrate the curling away when the primary evaporator has its temperature lowered. By this construction a considerable amount of curling may be obtained to provide wide variations in the contact between the secondary condenser 146 and the primary evaporator in order to maintain substantially constant the temperatures of the lower compartment. Shims 155 held in place beneath the condenser 146 by the clamping screw 153 extending through the aperture 159 in the shim may be used to provide an adjustment by tilting the rear end of the condenser 146 in either direction. The clamping bar 151 and the clamping screw 153 are readily removable so that the primary evaporator 130 may be removed for service and repair. The remainder of the refrigerator and system is the same as that shown in Figs. 1 to 4.

Figure 10:
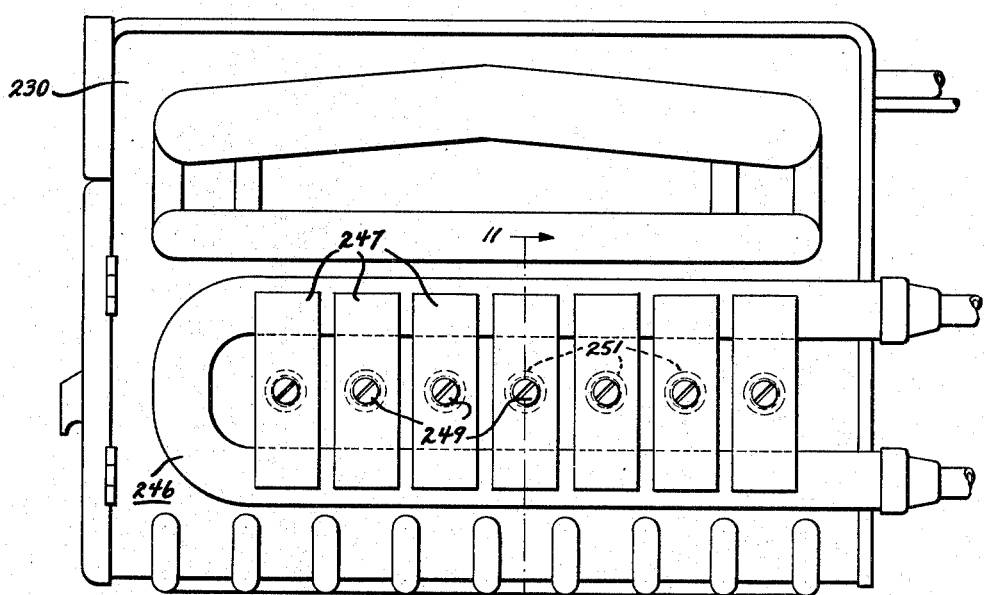
Fig. 10 is a view similar to Figs. 2 and 6 showing still a third form of the invention.
Figure 11:
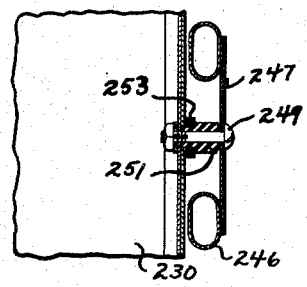
Fig. 11 is a sectional view taken along the lines 11—11 of Fig. 10 showing the position of the secondary condenser when the temperature of the primary evaporator is at its lowest point.
Figure 12:
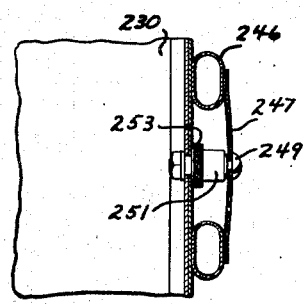
Fig. 12 is a sectional view taken along the lines 11—11 of Fig. 10 showing the secondary condenser in the position it assumes at normal temperatures of the primary evaporator.

In Figs. 10 to 12 a third modification is shown which is similar to the modifications shown in Figs. 1 to 8 excepting for the method of mounting the secondary condenser upon the side wall of the primary evaporator and the manner in which the contact between the primary evaporator and the secondary condenser is controlled. In this modification the primary evaporator is designated by the reference character 230 and the secondary condenser designated by the reference character 246. The secondary condenser 246 is preferably formed of a flattened copper tubing bent in the form of a hairpin. Extending across the upper and lower legs of the hairpin are a plurality of uniformly spaced bimetal strips 247. These bimetal strips 247 are welded or suitably soldered at their ends or otherwise fastened to the outer face of the flattened copper tubing. At their center point they are each fastened to the smooth side wall of the primary evaporator 230 by bolts 249. Surrounding the bolts 249 are bushings 251 of insulating material which serve to properly space the bimetal strips 247 as well as the copper tubing of the secondary condenser 246 away from the smooth side wall of the primary evaporator 230. These bushings 251 are provided with thin washers 253 which may be peeled off or added in order to provide an adjustment for varying the position of the bimetal strips 247 and the secondary condenser 246 with respect to the smooth side wall of the primary evaporator 230. In this form by the use of uniform bimetal strips and uniform spacing bushings 251 and washers 253 the secondary condenser may be moved uniformly away from the smooth side wall of the primary evaporator for controlling the heat transfer between the two refrigerant circuits. However, by making the bushings or the bimetals or both non-uniform the secondary condenser 246 may move progressively away from the primary evaporator beginning at one end of the secondary condenser in a manner somewhat similar to the curling action provided in the first two modifications. Fig. 11 shows the secondary condenser lifted away from the smooth wall of the primary evaporator 230 illustrating the position which the secondary condenser would assume when the primary evaporator was at extremely low temperatures. Fig. 12 shows the secondary condenser 246 held firmly against the smooth side wall of the primary evaporator 230 by the bimetal 247. It will be understood that the contact pressure as well as the contact area in all the modifications will vary in accordance with the temperature of the primary evaporator in order to control the heat transfer between the walls of the primary evaporator and the secondary condenser so as to regulate the temperature of the secondary evaporator and thereby regulate and maintain substantially uniform the temperature of the lower or food storage compartment.

By this form of control I have provided means for regulating the temperature of the secondary evaporator and the lower compartment which is extremely simple and which is entirely outside of either refrigerant circuit. It also contains the minimum of moving parts and these moving parts are such that thee is substantially no wear and little possibility of failure.

While the form of embodiment of the invention as herein disclosed, constitutes a preferred form, it is to be understood that other forms might be adopted, all coming within the scope of the claims which follow.

What is claimed is as follows:

1. Refrigerating apparatus including a primary refrigerant circuit including liquefying and evaporating means enclosed in metal walls, a secondary refrigerant circuit enclosed in metal walls, a portion of the metal walls of the primary circuit being in contact with a portion of the metal walls of the secondary circuit, and thermostatic means for varying the area of contact between the walls of the primary and secondary circuits.

2. Refrigerating apparatus including a primary refrigerant circuit including liquefying and evaporating means enclosed in metal walls, a secondary refrigerant circit enclosed in metal walls, a portion of the metal walls of the primary circuit being in contact with a portion of the metal walls of the secondary circuit, and thermostatic means for varying the contact pressure between the walls of the primary and secondary circuits.

3. Refrigerating apparatus including a primary refrigerant circuit including a primary evaporator, a secondary refrigerant circuit in heat exchange relationship with the primary circuit, and thermostatic means responsive to the temperature of the primary evaporator for controlling the heat transfer between the two circuits.

4. Refrigerating apparatus including means forming a plurality of compartments to be cooled, a primary refrigerant circuit including a primary evaporating means in heat exchange relation with one of said compartments, a secondary refrigerant circuit including a secondary evaporating means in heat exchange relation with a second compartment, and means responsive to temperature conditions of said one compartment for controlling heat transfer between the primary and secondary circuits.

5. Refrigerating apparatus including means forming a plurality of compartments to be cooled, a primary refrigerant circuit including a primary evaporating means in heat exchange relation with one of said compartments, a secondary refrigerant circuit including a secondary evaporating means in heat exchange relation with a second compartment, and means responsive to temperature conditions of one of said compartments for controlling the contact between the primary and secondary circuits.

6. Refrigerating apparatus including a cabinet, means for dividing the cabinet into a plurality of compartments, a primary refrigerant evaporator having metal walls located in one of said compartments, means forming a closed metal walled secondary circuit having a portion in heat exchange relation with another of said compartments and having a contact portion clamped in contact with one of the metal walls of the primary evaporator, and thermostatic means for controlling the contact between said contact portion and said one metal wall.

CARL A. STICKEL.